(12) United States Patent
Stack et al.

(10) Patent No.: US 6,182,693 B1
(45) Date of Patent: Feb. 6, 2001

(54) VAPOR CANISTER AND FUEL TANK ASSEMBLY

(75) Inventors: Gary Francis Stack, Fenton; Michael Paul Murphy, Flint; Gregory Thomas Roth, Davison, all of MI (US)

(73) Assignee: Delphi Technologies, Inc., Troy, MI (US)

(*) Notice: Under 35 U.S.C. 154(b), the term of this patent shall be extended for 0 days.

(21) Appl. No.: 09/460,731

(22) Filed: Oct. 15, 1999

Related U.S. Application Data

(60) Provisional application No. 60/138,185, filed on Jun. 8, 1999.

(51) Int. Cl.[7] .................................................. B01D 47/00
(52) U.S. Cl. ...................................... 137/565.17; 123/519
(58) Field of Search ........................ 137/565.17; 123/516, 123/518, 519

(56) References Cited

U.S. PATENT DOCUMENTS

| | | | |
|---|---|---|---|
| 3,372,679 | * 3/1968 | Aitken | 123/519 |
| 3,757,753 | * 9/1973 | Hunt | 123/519 |
| 4,852,761 | 8/1989 | Turner et al. | |
| 4,919,103 | * 4/1990 | Ishiguro et al. | 123/519 X |
| 5,901,689 | * 5/1999 | Kimura et al. | 123/519 X |

* cited by examiner

Primary Examiner—John Rivell
(74) Attorney, Agent, or Firm—Vincent A. Cichosz

(57) ABSTRACT

A vapor canister and fuel tank assembly for a vehicle includes a fuel tank having an interior chamber and a tank opening communicating with the interior chamber. The vapor canister and fuel tank assembly also includes an insert disposed in the interior chamber and the tank opening and forming a vapor plenum chamber in the tank opening and a canister chamber therein. The vapor canister and fuel tank assembly includes a canister bed disposed in the canister chamber to absorb vapor fuel in the vapor plenum chamber. The vapor canister and fuel tank assembly further includes a coaxial line having one end for connection to an engine of the vehicle and another end connected to the vapor plenum chamber to allow liquid fuel to communicate with the interior chamber and vapor fuel to communicate with the vapor plenum chamber.

20 Claims, 2 Drawing Sheets

VAPOR CANISTER AND FUEL TANK ASSEMBLY

CROSS-REFERENCE TO RELATED APPLICATION(S)

The present invention claims the priority date of U.S. Provisional Patent Application Ser. No. 60/138,185, filed Jun. 8, 1999.

TECHNICAL FIELD

The present invention relates generally to fuel tanks for vehicles and, more particularly, to a vapor canister and fuel tank assembly for a vehicle.

BACKGROUND OF THE INVENTION

It is known to provide a fuel tank in a vehicle to hold fuel to be used by an engine of the vehicle. It is also known to provide a vapor recovery and storage system for the fuel tank of the vehicle. Typically, the vapor recovery and storage system includes a vapor canister remotely mounted such as in an engine compartment of the vehicle and operatively connected by separate external valves and lines to the fuel tank. The vapor recovery and storage system is prone to permeation losses, has limited vapor storage capacity, and limited vapor flow rate acceptance.

Although the above vapor recovery and storage system has worked, it is desirable to integrate the vapor canister into the fuel tank and eliminate separate components outside the fuel tank. It is also desirable to provide a vapor canister and fuel tank assembly in a vehicle that reduces permeation. It is further desirable to provide a vapor canister and fuel tank assembly in a vehicle that lowers cost, lowers evaporative emissions and is easier to package in a vehicle.

SUMMARY OF THE INVENTION

It is, therefore, one object of the present invention to provide a vapor canister and fuel tank assembly for a vehicle.

It is another object of the present invention to provide a vapor canister and fuel tank assembly for a vehicle that puts the vapor canister, valves, lines, and pressure sensor inside the fuel tank.

It is yet another object of the present invention to provide a vapor canister and fuel tank assembly for a vehicle that reduces evaporative emissions.

To achieve the foregoing objects, the present invention is a vapor canister and fuel tank assembly for a vehicle including a fuel tank having an interior chamber and a tank opening communicating with the interior chamber. The vapor canister and fuel tank assembly also includes an insert disposed in the interior chamber and the tank opening and forming a vapor plenum chamber in the tank opening and a canister chamber therein. The vapor canister and fuel tank assembly includes a canister bed disposed in the canister chamber to absorb vapor fuel in the vapor plenum chamber. The vapor canister and fuel tank assembly further includes a coaxial line having one end for connection to an engine of the vehicle and another end connected to the vapor plenum chamber to allow liquid fuel to communicate with the interior chamber and vapor fuel to communicate with the vapor plenum chamber.

One advantage of the present invention is that a vapor canister and fuel tank assembly is provided for a vehicle. Another advantage of the present invention is that the vapor canister and fuel tank assembly reduces evaporative emissions by locating the vapor canister, valves, lines, and pressure sensor inside the fuel tank, thereby combining components and their functions into a tank vapor space. Yet another advantage of the present invention is that the vapor canister and fuel tank assembly locates the vapor canister and components inside the fuel tank, which reduces connections, lessens surfaces exposed to permeation, easier to mount and can use less expensive components. Still another advantage of the present invention is that the vapor canister and fuel tank assembly provides a vapor canister exposed only to vapor fuel and isolated from liquid fuel, water, salt, dirt, etc., minimizing external connectors and prevents the pressure sensor from being contaminated. A further advantage of the present invention is that the vapor canister and fuel tank assembly is easier to package in the vehicle and can be made of steel to eliminate permeation. Yet a further advantage of the present invention is that the vapor canister and fuel tank assembly has lower cost due to fewer parts, is easier to mount and can use less expensive materials and components inside the fuel tank.

Other objects, features and advantages of the present invention will be readily appreciated, as the same becomes better understood after reading the subsequent description taken in conjunction with the accompanying drawings.

DESCRIPTION OF THE PREFERRED EMBODIMENT

Figure 1:
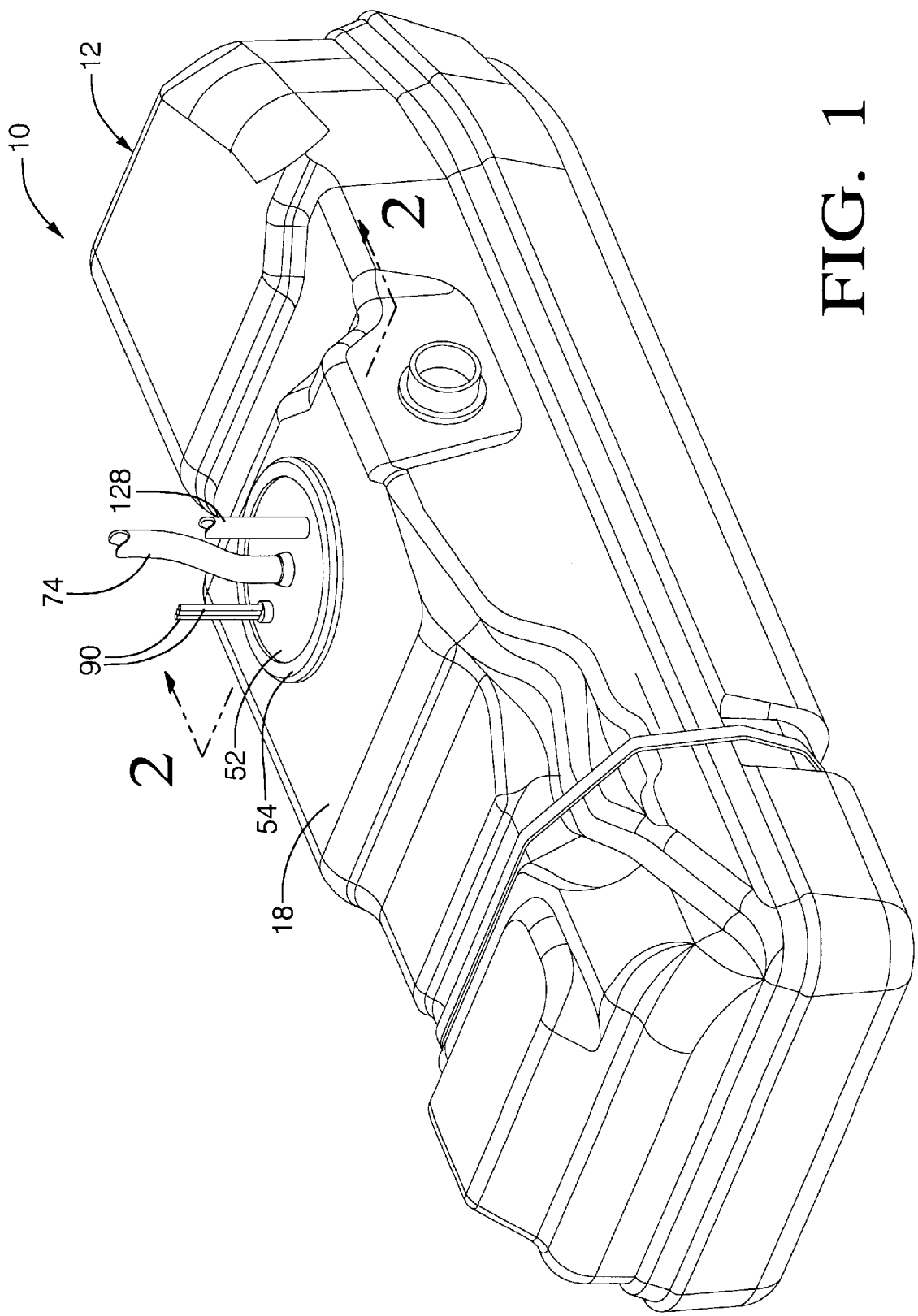
FIG. 1 is a fragmentary elevational view of a vapor canister and fuel tank assembly, according to the present invention.
Figure 2:
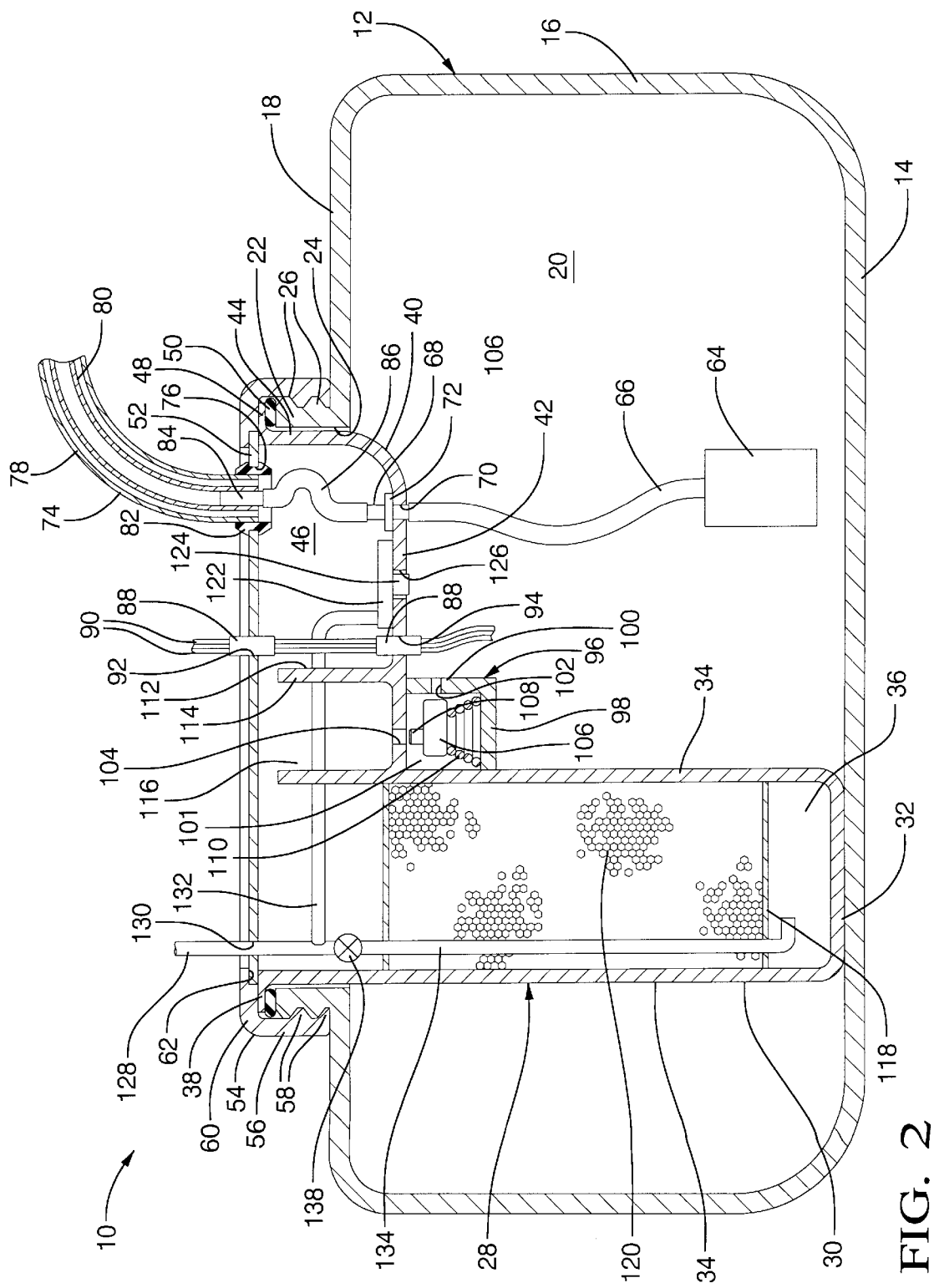
FIG. 2 is a sectional view taken along line 2—2 of FIG. 1.

Referring to the drawings and in particular FIGS. 1 and 2, one embodiment of a vapor canister and fuel tank assembly 10, according to the present invention, is shown for a vehicle (not shown). The vapor canister and fuel tank assembly 10 includes a fuel tank, generally indicated at 12, to hold liquid fuel. In this embodiment, the fuel tank 12 includes a bottom or base wall 14 and a side wall 16 around a periphery of the base wall 14 and extending generally perpendicular thereto. The fuel tank 12 also includes a top wall 18 extending generally perpendicular to the side wall 16 to form an interior chamber 20. The fuel tank 12 further includes a flange 22 extending outwardly and generally perpendicular to the top wall 18 to form a tank opening 24 communicating with the interior chamber 20. The flange 22 has a plurality of external threads 26 for a function to be described. The fuel tank 12 is made of a rigid material, preferably a plastic material. It should be appreciated that the fuel tank 12 could be made of a metal material such as steel.

The vapor canister and fuel tank assembly 10 includes an insert, generally indicated at 28, disposed in the interior chamber 20 and tank opening 24 of the fuel tank 12. The insert 28 includes a canister portion 30 to hold a canister bed to be described. The canister portion 30 has a base wall 32 disposed adjacent to and resting upon the base wall 14 of the fuel tank 12. The base wall 32 is generally circular in shape. The canister portion 30 also has a side wall 34 surrounding a periphery of the base wall 32 and extending generally perpendicular thereto and upwardly into the tank opening 24 to form a canister chamber 36. The side wall 34 has a flange 38 extending along a portion thereof and generally perpendicular thereto to overlap a portion of the flange 22 of the fuel tank 12.

The insert 28 also includes a plenum portion 40 connected to the canister portion 30 to form a vapor plenum in the fuel tank 12. The plenum portion 40 has a base wall 42 connected to the side wall 34 of the canister portion 30 and disposed in the interior chamber 20 adjacent to the tank opening 24 of the fuel tank 12. The base wall 42 is generally circular in shape. The plenum portion 40 also has a side wall 44 surrounding a periphery of the base wall 42 and extending generally perpendicular thereto and upwardly into the tank opening 24 to form the vapor plenum chamber 46. The side wall 44 has a flange 48 extending along a portion thereof and generally perpendicular thereto to overlap a portion of the flange 22 of the fuel tank 12. The insert 28 is made of a rigid material, preferably a plastic material. The insert 28 is a monolithic structure being integral, unitary and one-piece.

The vapor canister and fuel tank assembly 10 includes a seal 50 disposed between the flange 22 of the fuel tank 12 and the flanges 38 and 48 of the insert 28. The seal 50 is generally a circular ring and is made of a flexible material such as an elastomer. The vapor canister and fuel tank assembly 10 also includes a cover plate 52 disposed adjacent the flanges 38 and 48 of the insert 28 opposite the seal 50. The cover plate 52 is generally circular in shape and made of a rigid material, preferably a plastic material. The vapor canister and fuel tank assembly 10 includes a cover locking mechanism 54 to removably secure the cover plate 52, seal 50 and insert 28 to the fuel tank 12. The cover locking mechanism 54 has a side wall 56 extending axially and annularly with a plurality of internal threads 58 to matingly engage the external threads 26 on the flange 22. The cover locking mechanism 54 also has a top wall 60 extending generally perpendicular to the side wall 56 to overlap and abut the flange 22. The top wall 60 has a recess 62 for the cover plate 52. The cover locking mechanism 54 is made of a rigid material, preferably plastic. The cover locking mechanism 54 is a monolithic structure being integral, unitary and one-piece.

The vapor canister and fuel tank assembly 10 also includes a fuel pump 64 disposed in the interior chamber 20 of the fuel tank 12 and having a pressure fuel line or conduit 66 connected thereto. The vapor canister and fuel tank assembly 10 includes a fluid connector 68 extending axially through an aperture 70 of the base wall 42 of the insert 28 and having one end connected to the pressure fuel line 66. The fluid connector 68 has a flange 72 extending radially outwardly and abutting the base wall 42. The vapor canister and fuel tank assembly 10 also includes a coaxial line or conduit 74 having one end extending through an aperture 76 in the cover plate 52 and into the vapor plenum chamber 46 and another end connected to an engine (not shown) of the vehicle. The coaxial line 74 includes a first or outer vapor purge line or conduit 78 and a second or inner fuel line or conduit 80 disposed within and spaced radially from the vapor purge line 78. The vapor canister and fuel tank assembly 10 includes a seal 82 such as a grommet to hold and seal the vapor purge line 78 in the aperture 76 of the cover plate 52. The vapor canister and fuel tank assembly 10 also includes a fuel connector 84 having one end disposed in the end of the fuel line 80 and extending axially into the vapor plenum chamber 46. The vapor canister and fuel tank assembly 10 includes a connecting line or conduit 86 having one end connected to the fuel connector 84 and the other end connected to the fluid connector 68.

The vapor canister and fuel tank assembly 10 includes at least one electrical connector 88 having a plurality of wires 90 attached thereto extending axially through an aperture 92 in the cover plate 52 and an aperture 94 in the base wall 42 of the insert 28. The wires 90 have one end connected to a source of power such as a controller (not shown) and another end connected to various components inside the fuel tank 12 such as the fuel pump 64.

The vapor canister and fuel tank assembly also includes an on-board refueling vapor recovery (ORVR) or vent valve assembly, generally indicated at 96, disposed in the interior chamber 20. The vent valve 96 includes a base wall 98 having one end attached to the side wall 34 of the insert 28 and a side wall 100 extending generally perpendicular to the base wall 98 and attached to the base wall 42 of the insert 28 to form a valve chamber 101. The side wall 100 has an aperture 102 extending therethrough and communicating with the valve chamber 101 for a function to be described. The vent valve assembly 96 also includes an aperture 104 extending through the base wall 42 of the insert 28 and communicating with the valve chamber 101 for a function to be described. The vent valve assembly 96 includes a valve 106 disposed in the valve chamber 101 and having a projection 108 for opening and closing the aperture 104. The vent valve assembly 96 includes a spring 110 disposed in the valve chamber 101 between the valve 106 and base wall 42 to urge the projection 108 toward the aperture 104 to close the aperture 104. The spring 110 is preferably of a coil type.

The vapor canister and fuel assembly 10 includes a liquid trap 112 in the vapor plenum chamber 46 for liquid fuel. The liquid trap 112 includes a wall 114 spaced radially from the side wall 34 and extending generally parallel thereto from the base wall 42 of the insert 28. The wall 114 is annular to mate with the side wall 34 and be connected thereto to form a generally cylindrical liquid chamber 116. The wall 114 is preferably integral, unitary and one-piece with the insert 28.

The vapor canister and fuel tank assembly 10 includes a canister bed 118 disposed in the canister chamber 36. The canister bed 118 is generally cylindrical in shape and includes a vapor absorbing material such as activated charchol 120. It should be appreciated that the canister bed 118 is conventional and known in the art.

The vapor canister and fuel tank assembly 10 includes a pressure sensor 122 for sensing the pressure of the fuel. The pressure sensor 122 is disposed in the vapor plenum chamber 46 adjacent the base wall 42 of the insert 28 and has a projection 124 extending through an aperture 126 in the base wall 42. The vapor canister and fuel tank assembly 10 includes an air line or conduit 128 extending through an aperture 130 in the cover plate 52 and having one end connected to a filter (not shown) of the engine. The air line 128 has a first portion 32 connected to the pressure sensor 122 and a second portion 134 extending through the canister bed 118 to the bottom of the canister chamber 36. The vapor canister and fuel tank assembly 10 further includes a vent solenoid valve 138 fluidly connected to the second portion 134 of the air line 128 and electrically connected to the wires 90. The vent solenoid valve 138 is cycled to provide outside filtered air to a bottom of the canister bed 118.

In operation, liquid fuel in the interior chamber 20 of the fuel tank 12 through the pressure fuel line 66, fluid connector 68, conduit 86, fuel connector 84 and fuel line 80 to the engine. If there is a liquid fuel leak from the fuel line 80, the liquid fuel would travel through the vapor purge line 78 back to the vapor plenum chamber 46 and become trapped in the liquid trap 112. The liquid fuel in the chamber 116 would eventually accumulate to overcome the force of the spring 110 and push the projection 108 from the aperture 108. The liquid fuel flows from the chamber 116 through the aperture 104 and into the valve chamber 101. When a sufficient amount of liquid fuel accumulates in the valve chamber 101, it flows through the aperture 102 and into the interior chamber 20. If any vapor fuel is in the fuel tank 12 or engine is purged to the vapor plenum chamber 46 and is absorbed by the vapor absorbing material 120 in the canister bed 118. Filtered air is pumped to the pressure sensor 122 and to the canister bed 118 to flush the canister bed 118. It should be appreciated that the pumping of liquid fuel and purging of vapor fuel is conventional and known in the art.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A vapor canister and fuel tank assembly for a vehicle comprising:
   a fuel tank having an interior chamber and a tank opening communicating with said interior chamber;
   an insert disposed in said interior chamber and said tank opening and forming a vapor plenum chamber in said tank opening and a canister chamber therein;
   a canister bed disposed in said canister chamber to absorb vapor fuel in said vapor plenum chamber; and
   a coaxial line having one end for connection to an engine of the vehicle and another end connected to said vapor plenum chamber to allow liquid fuel to communicate with said interior chamber and vapor fuel to communicate with said vapor plenum chamber.

2. A vapor canister and fuel tank assembly as set forth in claim 1 including a cover to cover said tank opening and having at least one aperture extending therethrough, said coaxial line extending through said at least one aperture.

3. A vapor canister and fuel tank assembly as set forth in claim 1 wherein said coaxial line comprises a first conduit for fluid flow of vapor fuel and a second conduit disposed within and spaced from said first conduit for fluid flow of liquid fuel.

4. A vapor canister and fuel tank assembly as set forth in claim 2 including a fuel pump disposed in said interior chamber and a fuel line communicating with said fuel pump and said second conduit.

5. A vapor canister and fuel tank assembly as set forth in claim 1 wherein said insert comprises a canister portion forming said canister chamber and a plenum portion forming said plenum chamber.

6. A vapor canister and fuel tank assembly as set forth in claim 5 wherein said canister portion comprises a base wall and a side wall extending generally perpendicular to said base wall and into said tank opening and a flange extending generally perpendicular from said side wall and past said tank opening.

7. A vapor canister and fuel tank assembly as set forth in claim 5 wherein said plenum portion comprises a base wall and a side wall extending generally perpendicular to said base wall and into said tank opening and a flange extending generally perpendicular from said side wall and past said tank opening.

8. A vapor canister and fuel tank assembly as set forth in claim 5 wherein said canister portion and said plenum portion are integral, unitary and formed as one-piece.

9. A vapor canister and fuel tank assembly as set forth in claim 1 including a vent valve assembly connected to said insert to allow liquid fuel to pass from said vapor plenum to said interior chamber.

10. A vapor canister and fuel tank assembly as set forth in claim 1 including a pressure sensor disposed in said vapor plenum adjacent said insert and having a portion extending through said insert and into said interior chamber to sense pressure of liquid fuel therein.

11. A vapor canister and fuel tank assembly as set forth in claim 1 including an air line extending through said tank opening and having an end disposed below said canister to provide pressurized air thereto.

12. A vapor canister and fuel tank assembly for a vehicle comprising:
    a fuel tank having an interior chamber and a tank opening communicating with said interior chamber;
    an insert disposed in said interior chamber and said tank opening and having a canister portion forming a canister chamber and a plenum portion forming a vapor plenum chamber in said tank opening;
    a canister bed disposed in said canister chamber to absorb vapor fuel in said vapor plenum chamber;
    a cover to cover said tank opening and having at least one aperture extending therethrough; and
    a coaxial line having one end for connection to an engine of the vehicle and another end extending through said cover and into said vapor plenum chamber to allow liquid fuel to communicate with said interior chamber and vapor fuel to communicate with said vapor plenum chamber.

13. A vapor canister and fuel tank assembly as set forth in claim 12 wherein said coaxial line comprises a first conduit for fluid flow of vapor fuel and a second conduit disposed within and spaced from said first conduit for fluid flow of liquid fuel.

14. A vapor canister and fuel tank assembly as set forth in claim 13 including a fuel pump disposed in said interior chamber and a fuel line communicating with said fuel pump and said second conduit.

15. A vapor canister and fuel tank assembly as set forth in claim 12 wherein said canister portion comprises a base wall and a side wall extending generally perpendicular to said base wall and into said tank opening and a flange extending generally perpendicular from said side wall and past said tank opening.

16. A vapor canister and fuel tank assembly as set forth in claim 12 wherein said plenum portion comprises a base wall and a side wall extending generally perpendicular to said base wall and into said tank opening and a flange extending generally perpendicular from said side wall and past said tank opening.

17. A vapor canister and fuel tank assembly as set forth in claim 12 wherein said canister portion and said plenum portion are integral, unitary and formed as one-piece.

18. A vapor canister and fuel tank assembly as set forth in claim 12 including a vent valve assembly connected to said insert to allow liquid fuel to pass from said vapor plenum to said interior chamber.

19. A vapor canister and fuel tank assembly as set forth in claim 12 including a pressure sensor disposed in said vapor plenum adjacent said insert and having a portion extending through said insert and into said interior chamber to sense pressure of liquid fuel therein.

20. A vapor canister and fuel tank assembly for a vehicle comprising:

a fuel tank having an interior chamber and a tank opening communicating with said interior chamber;

an insert disposed in said interior chamber and said tank opening and having a canister portion forming a canister chamber and a plenum portion forming a vapor plenum chamber in said tank opening;

a canister bed disposed in said canister chamber to absorb vapor fuel in said vapor plenum chamber;

a cover to cover said tank opening and having at least one aperture extending therethrough;

a fuel pump disposed in said interior chamber to pump liquid fuel therein; and a coaxial line comprising a first conduit and a second conduit disposed within and spaced from said first conduit, said first conduit and said second conduit having one end for connection to an engine of the vehicle and another end extending through said cover and into said vapor plenum chamber, said second conduit being operatively connected to said fuel pump to allow liquid fuel to flow therein and said first conduit communicating with said vapor plenum chamber to allow vapor fuel to flow therein.

* * * * *